Jan. 31, 1928.

V. BENDIX

BRAKE SHOE

Filed Aug. 29, 1927

1,657,852

INVENTOR
VINCENT BENDIX
BY
*M. W. McConkey*
ATTORNEY

Patented Jan. 31, 1928.

1,657,852

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKE SHOE.

Application filed August 29, 1927. Serial No. 216,095.

This invention relates to brakes and is illustrated as embodied in a brake shoe or an equivalent brake friction member having a novel construction, preferably such as to facilitate mounting a roller or other thrust member at its end.

According to one important feature of the invention, there are a pair of plates spot-welded or otherwise secured to opposite sides of the friction member and which project at its end as a pair of spaced supports between which the thrust roller is mounted. I prefer to arrange an operating cam to engage the roller, the cam being formed in such a manner as to hold the end of the friction member against lateral movement. This may be done by grooving the cam to embrace the roller or by causing the pair of plates to project beyond the roller on opposite sides to embrace the cam or its equivalent between them.

Another feature of novelty relates to reinforcing the shoe, particularly at its end, by providing a reinforcing plate or a pair of such plates on opposite sides of the web, which are secured to the web and which have lugs bent at right angles and secured to the web at the inner face of the shoe. In the illustrated arrangement these plates also serve, as explained above, to carry the thrust roller for engagement with the cam or any equivalent applying device.

The above and other objects and features of the invention, including various combinations of parts and desirable particular constructions, will be apparent from the following description of the illustrated embodiments shown in the accompanying drawing, in which.

Figure 3:
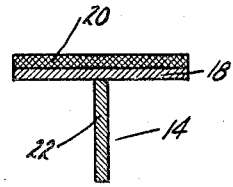
Figure 3 is a section through one of the brake shoes on the line 3—3 of Figure 1.

The brake selected for illustration includes a rotatable drum 10 at the open side of which is a backing plate and within which is arranged the friction means of the brake, illustrated as including brake shoes 14 and 16. As best illustrated in Figure 3, each of the brake shoes is built up of an outer arcuate rim 18 to which the brake lining 20 is riveted or otherwise secured and which is strengthened by a central reinforcing member or web 22 welded or otherwise secured to the inner face of the rim.

Figure 4:
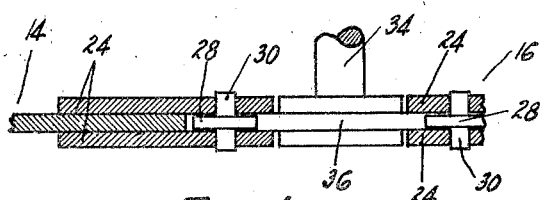
Figure 4 is a partial section corresponding to Figure 2 but showing the plates arranged to project beyond the rollers to embrace the applying cam.
Figure 5:
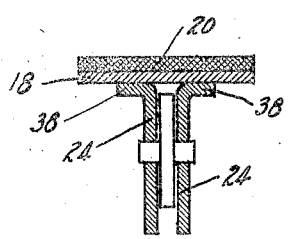
Figure 5 is a section through the end of one of the shoes substantially on the line 5—5 of Figure 1 and showing the reinforcing of the end of the shoes by the above-described lugs.

According to an important feature of the invention, the web 22 is provided at its end with a pair of plates 24 spot-welded or otherwise secured to its opposite sides and which project beyond the end of the web to form spaced supports for an antifriction roller 26 (Figure 1) or 28 (Figure 4). Each of the rollers is provided with a spindle or pintle 30 journalled in openings in plates 24.

Figure 1:
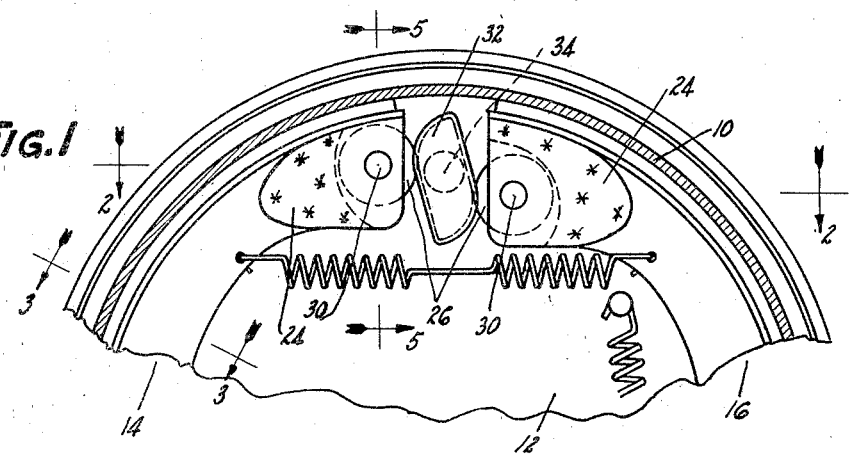
Figure 1 is a vertical section through the upper part of the brake, just inside the head of the brake drum, and showing the upper ends of the brake shoes in side elevation.
Figure 2:
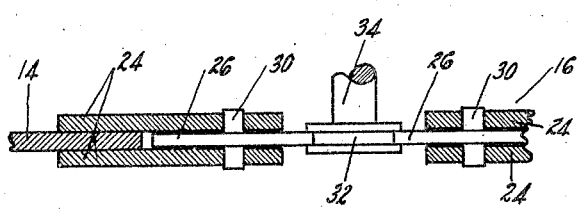
Figure 2 is a partial section on the line 2—2 of Figure 1, showing the mountings of the rollers.

In the arrangement shown in Figures 1 and 2, the rollers 26 are large enough to project beyond the plates 24 and are engaged by a cam 32 which is grooved to embrace the rollers to prevent lateral movement of the ends of the brake shoes. The cam 32 is shown as operated in the usual manner by operating shaft 34. In the arrangement of Figure 4 the rollers 28 are smaller than the rollers 26 so that the plates 24 project beyond the rollers to embrace an edge cam 36 which engages the rollers and extends between the plates 24.

In order to reinforce the shoe at its end, the plates 24 of each of the shoes are preferably formed with lugs 38 bent at right angles to the bodies of the plates and spot-welded or otherwise secured to the inner face of the rim 18.

While two illustrative embodiments of the invention have been described in detail, it is not my intention to limit its scope to those particular embodiments or otherwise than by the terms of the appended claims.

I claim:

1. A brake friction member having a web at least at its end, in combination with a pair of plates secured to opposite sides of the web and projecting at said end as spaced supports, and a thrust roller mounted between the projecting parts of said plates.

2. A brake friction member having a web at least at its end, in combination with a pair of plates secured to opposite sides of the web and projecting at said end as spaced supports, and a thrust roller mounted between the projecting parts of said plates, together with an operating cam engaging said roller and arranged to hold the end of the friction member against lateral movement.

3. A brake friction member having a web at least at its end, in combination with a pair of plates secured to opposite sides of the web and projecting at said end as spaced supports, and a thrust roller mounted between the projecting parts of said plates, said plates projecting beyond the roller to embrace an applying device engaging the roller.

4. A brake friction member having a web at least at its end, and a pair of plates secured to opposite sides of said web and projecting beyond said end, in combination with an applying device extending between the projecting parts of said plates.

5. A brake friction device having an outer rim and a stiffening web, in combination with a reinforcing plate secured to the side of the web and having a lug bent at right angles and secured to the inner face of the rim.

6. A brake friction device having an outer rim and a stiffening web, in combination with reinforcing plates secured to opposite sides of the web and each having a lug bent at right angles and secured to the inner face of the rim.

In testimony whereof, I have hereunto signed my name.

VINCENT BENDIX.